May 1, 1951 D. W. KAUFMANN 2,551,494
BRINE PRODUCING AND FILTERING APPARATUS
Filed March 9, 1949 2 Sheets-Sheet 1

INVENTOR
Dale W. Kaufmann
BY
Bean, Brooks, Buckley & Bean
ATTORNEYS

May 1, 1951 D. W. KAUFMANN 2,551,494
BRINE PRODUCING AND FILTERING APPARATUS
Filed March 9, 1949 2 Sheets-Sheet 2
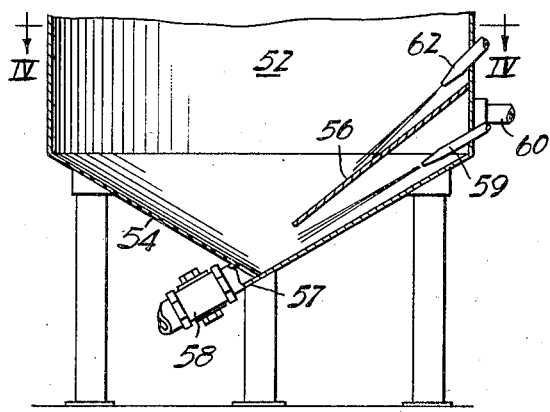
Fig. 3.
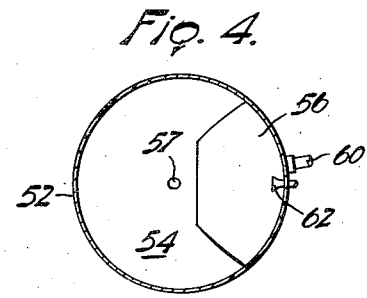
Fig. 4.
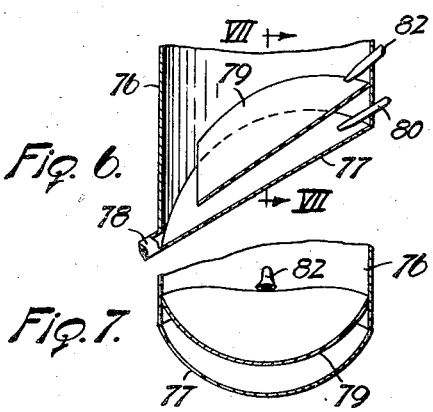
Fig. 6.
Fig. 7.
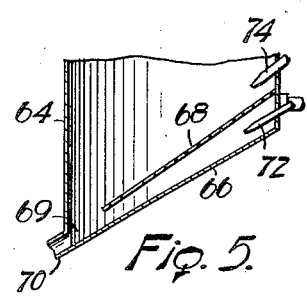
Fig. 5.
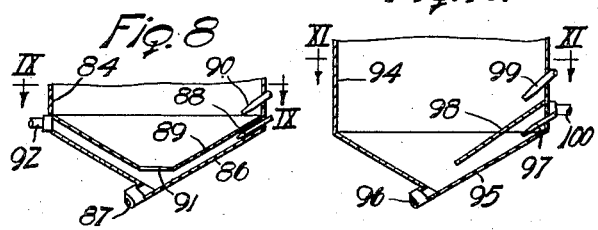
Fig. 8. Fig. 10. Fig. 12.
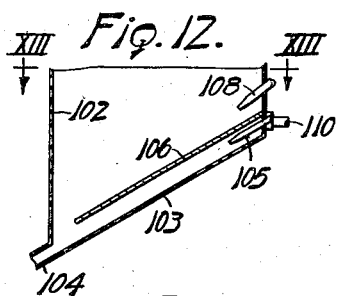
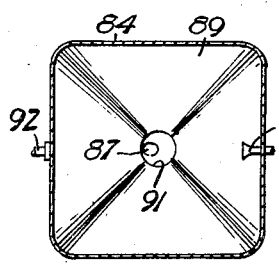
Fig. 9.
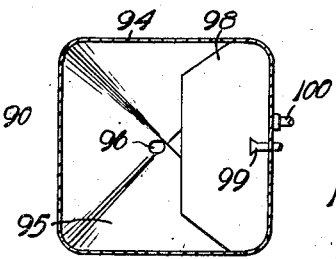
Fig. 11.
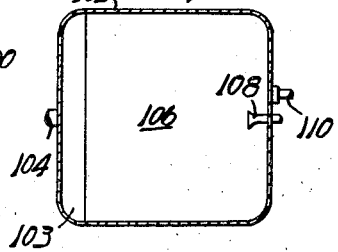
Fig. 13.
INVENTOR
Dale W. Kaufmann
BY
Bean, Brooks, Buckley & Bean.
ATTORNEYS Patented May 1, 1951

2,551,494

UNITED STATES PATENT OFFICE 2,551,494

BRINE PRODUCING AND FILTERING APPARATUS

Dale W. Kaufmann, Buffalo, N. Y., assignor to International Salt Company, Inc., Scranton, Pa.

Application March 9, 1949, Serial No. 80,383

5 Claims. (Cl. 23—272)

This invention relates to improvements in brine producing and filtering apparatus; and more particularly to improvements in apparatus of such type which employ the various commercially available grades and sizes of industrial salts. Specifically, the present invention relates to improvements in the apparatus disclosed in U. S. Patent No. 1,928,008; both inventions being developments under the same proprietorship.

As explained in the aforesaid prior patent, apparatus of the type was designed especially to dissolve salt which contains substantial percentages of impurities including shale and calcium and iron compositions. The apparatus of the present invention, however, is also designed to filter and strengthen in improved manner process brine which has been previously used and weakened and heavily fouled with suspended extraneous matter, as well as to remove the raw salt impurities referred to hereinabove. Whereas, such impurities normally tend to discolor and contaminate any brine produced therefrom, an apparatus of the type referred to is designed to filter the brine as it is produced by passage thereof through a body of granular salt so as to produce clear brine. Hence, the apparatus requires periodic servicing to remove the accumulation of impurities from the filter medium; and although the apparatus of the prior patent included means designed to permit such periodic cleaning it has been found that substantial improvements may be made therein whereby to greatly facilitate the operation of reconditioning the apparatus subsequent to periodic accumulation of impurities in the salt filter bed.

Thus, it may be stated that a primary object of the present invention is to provide in an apparatus of the character referred to an improved filter bed and filter bed support and clean-out arrangement; but other objects and advantages of the invention will be apparent from the specification hereinafter.

In the drawing:

Fig. 3 is a fragmentary sectional view corresponding to a portion of the apparatus of Fig. 1, but showing another form of apparatus embodying the invention;

Fig. 4 is a section, on a reduced scale, taken along line IV—IV of Fig. 3;

Figs. 5 and 6 are fragmentary views corresponding to Fig. 3, but of other forms of apparatuses of the invention;

Fig. 7 is a fragmentary sectional view taken along line VII—VII of Fig. 6;

Fig. 8 is a view similar to Figs. 3, 5, 6, but showing another embodiment of the invention;

Fig. 9 is a section taken along line IX—IX of Fig. 8;

Fig. 10 is a view similar to Figs. 3, 5, 6, 8, but showing still another embodiment of the invention;

Fig. 11 is a sectional view taken along line XI—XI of Fig. 10;

Fig. 12 is a view corresponding to Figs. 3, 5, 6, 8, 10, but showing still another embodiment of the invention; and Fig. 13 is a section taken along line XIII—XIII of Fig. 12.

Figure 2:
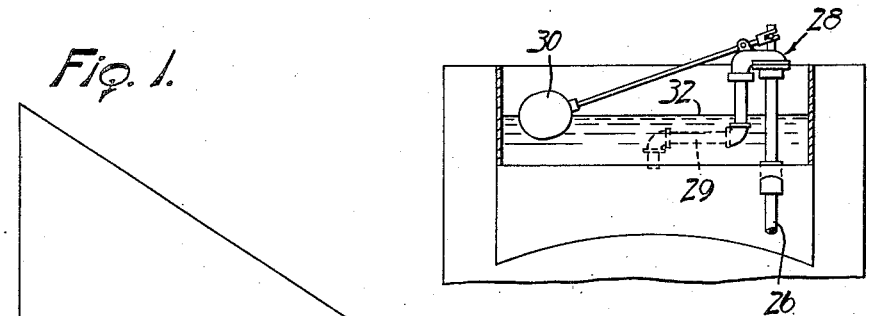
Fig. 2 is a fragmentary section taken along line II—II of Fig. 1.
Figure 1:
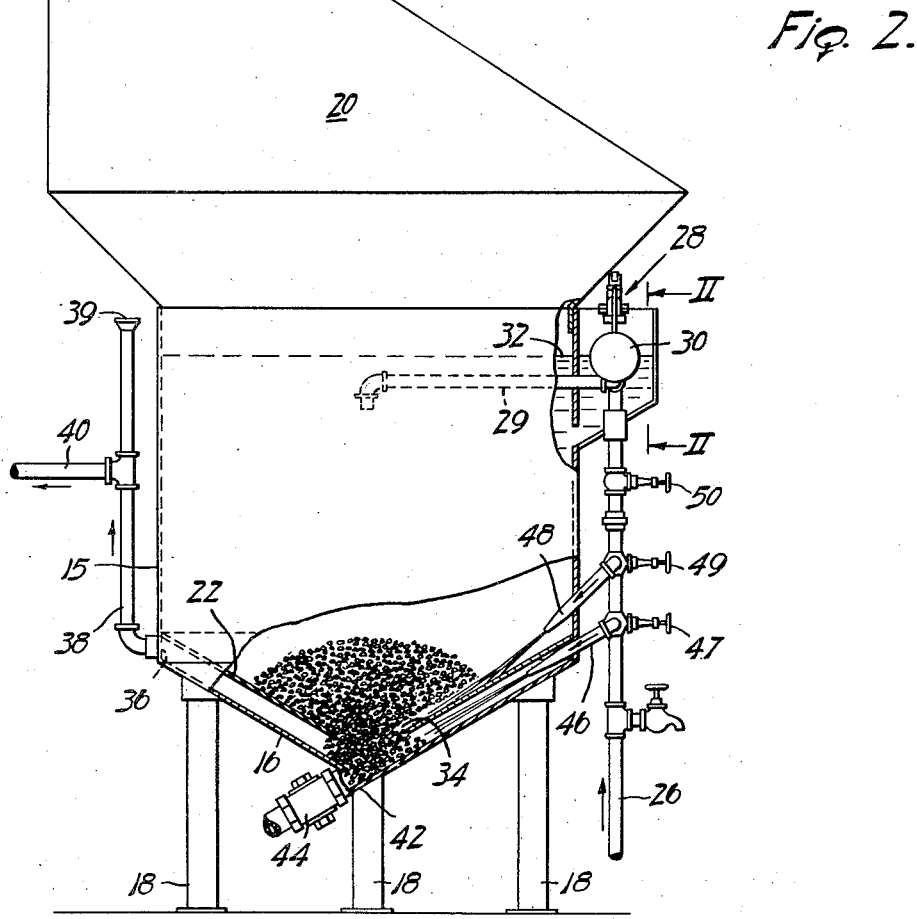
Fig. 1 is an elevation, partly in section and partly broken away, of a salt dissolving apparatus constructed according to one possible embodiment of the invention.

Referring now specifically to Figs. 1–2 of the drawing, the invention is illustrated therein as being embodied in a salt dissolving apparatus including generally a cylindrical tank or vat 15 having a conically shaped bottom 16. The tank is supported upon legs 18, and is shown as being fitted with a supplemental hopper 20 to provide a salt storage space from which the salt supply gravity-feeds automatically into the tank 15, as may be required. Thus, the raw salt may be either continuously or batch-loaded into the hopper 20 from time to time, so as to provide a constantly available supply of salt which will feed automatically into the tank 15 in accord with the requirements of the system as will be explained more fully hereinafter.

A conically shaped false bottom plate 22 is mounted within the tank 15 in vertically spaced relation above the bottom plate 16 for support of the granular salt charge. As explained in the prior patent referred to hereinabove, a salt solvent such as water is introduced into the tank as by means of an inlet pipe or conductor 26 which leads through a valve 28 and thence through a feed pipe 29 to a discharge point centrally of the tank 15. A float device 30 is arranged to control the valve 28 automatically, so that a constant liquid level may be maintained within the tank, such as at the level indicated by the numeral 32. As explained hereinabove, the apparatus of the invention is also particularly suited to the reconditioning of a previously used process brine, as for example in a continuously circulating system as disclosed in my application Serial No. 70,504 filed January 12, 1949, now Patent No. 2,508,170; and in such case the liquid supplied through the pipe 26 will be the weakened brine which requires such reconditioning.

The false bottom plate 22 is apertured as indicated at 34 so as to permit brine to be filtered through the bed of salt and to be drawn off through the space between the bottom plates 16—22 and through an outlet port 36 into a pipe 38. The outlet pipe 38 extends vertically to a vent opening 39 which is disposed at an elevation above the level 32 of the liquid within the tank; and a brine take-off conduit 40 leads off from the pipe 38 to conduct the brine to the point of its use.

Thus, it will be appreciated that the salt supply is maintained to fill the tank while the water level is maintained therein at the elevation 32; and that as brine is withdrawn from the pipe 40 a fresh supply of brine is filtered through the salt bed 24 and thence passes through the opening 34 and upwardly through the space between the two bottom plates. Coincidentally with such brine withdrawal from the tank a new supply of fresh water is let into the tank through the valve 28 from the supply pipe 26; and thus the brine producing operation is continuous in accord with the requirements of the brine consuming operation.

As stated hereinabove impurities are usually present in the salt supply and in the case of common rock salt the supply will often include calcium sulphate of anhydrous characteristics which deposits between the salt granules under the brine; said deposits tending to combine with water molecules to form substantially insoluble hydrated compounds of calcium sulphate which tend in time to plug the interstices between the salt granules and to form a cemented mass of solids in the lower portion of the filter bed covering the aperture 34 through which the process brine must be withdrawn. Thus, the apparatus requires periodic servicing to remove such obstruction to brine flow.

The nature of the cemented mass which thus bridges over the brine outlet aperture is such that it resists dislodgment by simple washing operations such as are provided for in the prior patent referred to hereinabove; and water flushing arrangements for clearing out the insoluble residues from the vat as described in the aforesaid patent must of necessity be supplemented by manually performed mechanical agitation processes such as by prying into the mass with the aid of a crowbar or similar tool thrust through the open top of the vat and into the cemented mass portion of the filter bed. Such operations are necessarily time-consuming and difficult to perform, and at best are productive only of uncertain results and often result only in dislodgment of relatively large blocks of cemented material which then fall down into the brine removal opening and block the latter instead of being finely broken up so as to be flushed through the debris outlet.

In the case of the present invention the debris outlet is arranged for example as shown in Fig. 1 to comprise a conductor 42 which is welded or otherwise permanently fixed in open communication with a suitably apertured portion of the bottom plate 16 at the bottom apex thereof; the conductor 42 being arranged to extend away from the apex of the bottom plate in directional alignment with the space between the two bottom plates 16—22 at one side of the tank. A stop cock as indicated at 44 is disposed in the line of the conductor 42 for control of the debris cleaning operation. A water nozzle 46 is arranged to receive a pressured water supply from any suitable source, and for this purpose the nozzle 46 may be conveniently connected into the fresh water supply conduit 26 and controlled by a valve 47. In any case the nozzle is directed to discharge a jet of water downwardly between the bottom plates 16—22 in direct alignment with the opening into the conductor 42.

A second nozzle 48 is coupled also to a pressured water supply such as the conductor 26 and arranged to be controlled by a valve 49 for directing a forceful spray of water downwardly along the top surface of the false bottom plate 22. Thus, it will be appreciated that upon closing of a feed water supply control valve 50 and opening of the stop cock 44, the liquid within the tank will drain to the sewer through the conductor 42; and that the spray nozzle 46 may then be brought into play in such manner as to direct a jet of water directly against any solid matter that is accumulated in the bottom of the conical plate 16 below the aperture 34; thereby flushing such matter directly into and through the conductor 42. On the other hand the spray from the nozzle 48 is adapted to leach a path downwardly under one side of the cemented filter bed mass toward the aperture 34, thereby disrupting any accumulation of solid materials tending to blockade this opening; and it is a particular feature and advantage of the arrangement that this dual spray arrangement allows for either coincidental or alternate use of the sprays 46—48 whereby a variety of flushing effects may be obtained by simple manipulations of the valves 47—49—50.

For example, a typical tank cleaning operation might comprise first draining the tank of liquid by closing the water feed control valve 50 and opening the stop cock 44, and then first flushing the solids accumulation from below the aperture 34 directly downwardly through the conductor 42 by means of the bottom spray nozzle 46. Then, after the space immediately below the aperture 34 is emptied, the bottom spray nozzle may be closed and the upper spray nozzle 48 opened to discharge a flow of water downwardly against the bridging accumulation of solids directly over the aperture 34. Since the latter has been previously undermined the action by the water from the upper nozzle is thereby facilitated, and the cemented solids will become thereby disrupted and will crumble and wash through the aperture 34. Then, the bottom nozzle may again be opened so as to direct a pulverizing flow of water downwardly against the lumps of solid materials such as have fallen through the opening 34, so that the latter may be further reduced in size and effectively flushed directly into and through the conductor 42 to the sewer.

It has been determined that whereas the filter cleaning arrangement provided for and described in the prior patent referred to hereinabove is ofttimes unsuited to dislodgment of the accumulated solids over the position of the brine delivery aperture without manual assistance as by pry bars and the like as explained hereinabove, in the case of the present invention the filter bed may be effectively cleaned out and renewed by simple manipulation of the water control valves as explained hereinabove. This results in a much more satisfactory type operation in return for less operator attention and without experiencing the difficulties which are often attendant the use of the apparatus of the prior patent.

Figs. 3–13 inclusive, illustrate other forms of apparatuses embodying the features of the invention referred to hereinabove. For example, Figs. 3 and 4 illustrate a similar apparatus in conjunction with a circular tank 52 having a conical bottom 54 and a simple flat plate false bottom member 56 cut segmentally so as to fit within the tank at one side thereof to extend from one side wall portion thereof downwardly toward the center in substantially parallel but vertically spaced relation with respect to the bottom plate member 54. The debris conductor is indicated at 57 and a control valve at 58; and the pipe 57 is provided to extend in alignment with an opposing spray nozzle 59 arranged to spray a jet of water downwardly between the plates 54—56, as in the manner of the arrangement of Fig. 1. The brine outlet is indicated at 60, and a second spray nozzle 62 is mounted to discharge downwardly against the top side of the false bottom plate 56 as in the manner of the nozzle 48 of Fig. 1. Attention is called to the fact that as illustrated in Fig. 4, the spray nozzle 62 is preferably flattened at its discharge end so that the jet of water issuing therefrom will be of fan-like form whereby to substantially cover the surface of the plate 56, so as to undermine as large a portion as possible of the solid material accumulation in the bottom of the tank while the nozzles are manipulated to provide the bed renovating operation as explained hereinabove.

Fig. 5 illustrates another type of tank arrangement in which a cylindrical tank 64 is illustrated to be provided with an inclined flat bottom plate 66, and a false bottom 68 is similarly formed of flat plate and disposed within the tank so as to extend in vertically spaced relation above the bottom plate from one side of the tank downwardly toward the lowest bottom corner portion thereof. The debris discharge opening is illustrated at 69, and a debris conductor 70 is arranged to extend therefrom in directional alignment with a spray nozzle 72 which is arranged to direct a forceful spray of water downwardly within the space between the bottom plates 66—68. A second nozzle 74 is arranged to spray a jet of water downwardly above the false bottom plate 68; and thus it will be appreciated that the filter bed renovating operation referred to hereinabove may be obtained by proper selective or coincidental use of the jets 72—74.

Figs. 6–7 illustrate another form of structure embodying the invention, wherein a cylindrical tank 76 is provided with a cylindrically bent bottom plate 77 having the cylinder axis thereof inclined vertically so as to thereby provide a trough-like bottom plate structure sloping downwardly from one side of the tank wall to a point of debris discharge at the other side thereof. The debris discharge conductor is indicated at 78, and a cylindrically bent segmented false bottom plate 79 is fitted within the tank so as to be disposed substantially parallel to the bottom plate 77 but in vertically spaced relation therefrom. A bottom nozzle 80 is arranged to direct a jet of water downwardly between the bottom plates and in the trough of the plate 77 in direct alignment with the debris conductor 78, and a second spray nozzle 82 is arranged to direct a jet of water downwardly against the top surface of the false bottom plate 79 in the trough thereof; whereby the nozzle filter bed renovating operation referred to hereinabove may be obtained.

Figs. 8 and 9 illustrate another tank structure incorporating the filter bed renovating feature of the present invention, and in this instance the tank 84 is of generally flat walled form. The bottom plate 86 is therefore of inverted pyramid form with a debris outlet conductor 87 directed angularly away from the apex of the bottom plate so as to be in directional alignment with a spray nozzle 88 disposed to direct a jet of water between the bottom plate 86 and a similar pyramid shaped false bottom plate 89. A second nozzle 90 is arranged to spray downwardly against the upper surface of the false bottom plate 89. The brine outlet aperture is indicated at 91 and the brine take-off outlet is indicated at 92.

In Figs. 10–11, the tank 94 is illustrated to be of flat walled form, and the bottom plate 95 is therefore of inverted pyramidal form. The debris outlet conductor is indicated at 96 and is arranged in directional alignment with a spray nozzle 97 which is disposed to direct a jet of water downwardly toward the outlet 96 beneath a flat segmental false bottom plate 98 which extends only from one side wall of the tank to its approximate center. A top nozzle is indicated at 99 for directing a spray of water downwardly toward the debris outlet in a path generally parallel to the path of the spray from the nozzle 97, and the brine take-off outlet is indicated at 100.

Figs. 12–13 illustrate another form of tank arrangement comprising a flat walled tank 102 with a bottom plate 103 which is of simple flat inclined plate form. The debris outlet conduit is indicated at 104 as being in directional alignment with a nozzle 105 arranged to spray a jet of water downwardly between the bottom plate 103 and a flat inclined false bottom plate 106 which leads from one side wall of the tank to a position just short of the opposite wall. The upper nozzle is indicated at 108, and the brine outlet pipe is indicated at 110.

Thus, it will be appreciated that as in the case of Fig. 1, the structures of Figs. 3–13 inclusive are also arranged to provide the novel filter bed renovating operation referred to hereinabove; and that this mode of filter bed cleaning operation is not limited to any specific form of tank construction.

I claim:

1. A salt dissolving apparatus comprising a tank for salt to be dissolved and including salt storage means in open communication with said tank for maintaining a body of salt above the level of liquid in the tank, said tank having a bottom wall portion inclined downwardly toward an apertured portion thereof, a conduit coupled in open communication with said aperture and disposed to extend away therefrom in substantial directional alignment with the path of movement of material from said inclined bottom wall portion, valve means controlling passage of material through said conduit, false bottom plate means disposed within said tank to extend from a side wall portion thereof in downwardly inclined relation to a position adjacent said aperture, said false bottom plate means being arranged in vertically spaced substantially parallel relation with respect to said inclined bottom wall portion, conduit means having a discharge below the top level of the tank for introducing salt solvent into said tank, conduit means for withdrawing brine from said tank at a position between said inclined bottom wall portion and said false bottom plate means, a liquid nozzle disposed to direct a jet of liquid downwardly within the space between said inclined bottom wall portion and said false bottom plate means and in a downwardly inclined path directionally aligned with said aperture and said conduit, and at least one liquid nozzle directed against the top surface of said false bottom plate means.

2. A salt dissolving apparatus comprising a tank for salt to be dissolved and including salt storage means in open communication with said tank for maintaining a body of salt above the level of liquid in the tank, said tank having a bottom wall portion with an apertured portion therein, a sewer conduit coupled in open communication with said aperture and disposed to incline downwardly and to extend away therefrom in substantial directional alignment with the path of movement of material along said bottom wall portion, valve means controlling passage of material through said conduit, false bottom plate means disposed within said tank to extend from a side wall portion thereof to a position adjacent said aperture, said false bottom plate means being arranged in vertically spaced substantially parallel relation with respect to said bottom wall portion, conduit means having a discharge below the top level of the tank for introducing salt solvent into said tank, conduit means for withdrawing brine from said tank at a position between said bottom wall portion and said false bottom plate means, a liquid nozzle disposed to direct a jet of liquid within the space between said bottom wall portion and said false bottom plate means and in a path directionally aligned with said aperture and said sewer conduit, and at least one liquid nozzle directed against the top surface of said false bottom plate means.

3. A process brine filtering and restrengthening apparatus comprising a tank for salt to be dissolved to fortify said process brine and including salt storage means in open communication with said tank for maintaining a body of salt above the level of liquid in the tank, said tank having a bottom wall portion inclined downwardly toward an apertured portion thereof, a sewer conduit coupled in open communication with said aperture and disposed to incline downwardly to extend away therefrom in substantial directional alignment with said inclined bottom wall portion, valve means controlling passage of material through said conduit, false bottom plate means disposed within said tank to extend from a side wall portion thereof in downwardly inclined relation to a position adjacent said aperture, said false bottom plate means being arranged in vertically spaced substantially parallel relation with respect to said inclined bottom wall portion, conduit means having a discharge below the top level of the tank for introducing said process brine into said tank, conduit means for withdrawing filtered and fortified brine from said tank at a position between said inclined bottom wall portion and said false bottom plate means, a liquid nozzle disposed to direct a jet of liquid downwardly within the space between said inclined bottom portion wall and said false bottom plate means and in a downwardly inclined path directionally aligned with said aperture and said sewer conduit, and at least one liquid nozzle directed against the top surface of said false bottom plate means.

4. A salt dissolving apparatus comprising a tank for salt to be dissolved and including salt storage means in open communication with said tank for maintaining a body of salt above the level of liquid in the tank, said tank having a bottom wall portion inclined downwardly toward an apertured portion thereof, a sewer conduit coupled in open communication with said aperture and disposed to incline downwardly to extend away therefrom in substantial directional alignment with the path of movement of material along said inclined bottom wall portion, valve means controlling passage of material through said conduit, false bottom plate means disposed within said tank to extend from a side wall portion thereof in downwardly inclined relation to a position adjacent said aperture, said false bottom plate means being arranged in vertically spaced substantially parallel relation with respect to said inclined bottom wall portion, conduit means having a discharge below the top level of the tank for introducing salt solvent into said tank, conduit means for withdrawing brine from said tank at a position between said inclined bottom wall portion and said false bottom plate means, and at least one liquid nozzle directed against the top surface of said false bottom plate means.

5. A salt dissolving apparatus comprising a tank for salt to be dissolved and including salt storage means in open communication with said tank for maintaining a body of salt above the level of liquid in the tank, said tank having a cylindrically curved bottom wall portion inclined downwardly toward an apertured portion thereof, a sewer conduit coupled in open communication with said aperture and disposed to incline downwardly to extend away therefrom in directional alignment with said inclined bottom wall portion, valve means controlling passage of material through said conduit, a cylindrically curved false bottom plate means disposed within said tank to extend from a side wall portion thereof in downwardly inclined relation to a position adjacent said aperture, said false bottom plate means being arranged in vertically spaced substantially parallel relation with respect to said inclined bottom wall portion and similarly inclined, conduit means having a discharge below the top level of the tank for introducing salt solvent into said tank, conduit means for withdrawing brine from said tank at a position between said inclined bottom wall portion and said false bottom plate means, a liquid nozzle disposed to direct a jet of liquid downwardly within the space between said inclined bottom wall portion and false bottom plate means and in a downwardly inclined path directionally aligned with said aperture and said sewer conduit, and at least one liquid nozzle directed against the top surface of said false bottom plate means.

DALE W. KAUFMANN.

REFERENCES CITED

The following references are of record in the file of this patent:

UNITED STATES PATENTS

| Number | Name | Date |
|---|---|---|
| 1,613,601 | Allen | Jan. 11, 1927 |
| 1,775,264 | Allen | Sept. 9, 1930 |
| 1,928,008 | Courthope | Sept. 26, 1933 |
| 2,468,162 | Black | Aug. 26, 1949 |